(12) United States Patent
Aoki et al.

(10) Patent No.: US 11,969,828 B2
(45) Date of Patent: Apr. 30, 2024

(54) PREVENTION OF DRIPPING OF MATERIAL FOR MATERIAL INJECTION

(71) Applicant: INTERNATIONAL BUSINESS MACHINES CORPORATION, Armonk, NY (US)

(72) Inventors: Toyohiro Aoki, Kanagawa (JP); Eiji Nakamura, Tokyo (JP); Takashi Hisada, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/296,462

(22) Filed: Apr. 6, 2023

(65) Prior Publication Data

US 2023/0241700 A1    Aug. 3, 2023

Related U.S. Application Data

(60) Continuation of application No. 17/690,096, filed on Mar. 9, 2022, now Pat. No. 11,684,988, and a division
(Continued)

(51) Int. Cl.
*B23K 1/00* (2006.01)
*B23K 1/08* (2006.01)
(Continued)

(52) U.S. Cl.
CPC .............. *B23K 3/0638* (2013.01); *B23K 1/08* (2013.01); *B23K 1/20* (2013.01); *B23K 3/08* (2013.01)

(58) Field of Classification Search
CPC .............. B23K 3/0623; B23K 2101/40; B23K 3/0607; B23K 1/0016; B23K 1/20;
(Continued)

(56) References Cited

U.S. PATENT DOCUMENTS

| 1,960,067 A | 5/1934 | Rippl et al. |
| 4,004,733 A * | 1/1977 | Law ........................ B05B 5/043 239/707 |

(Continued)

FOREIGN PATENT DOCUMENTS

| CN | 102810489 A | 12/2012 |
| DE | 112010003509 B4 | 5/2016 |

(Continued)

OTHER PUBLICATIONS

List of IBM Patents or Patent Applications Treated as Related dated Apr. 6, 2023, 2 pages.
(Continued)

*Primary Examiner* — Erin B Saad
(74) *Attorney, Agent, or Firm* — Tutunjian & Bitetto, P.C.; Robert Richard Aragona

(57) ABSTRACT

An injection apparatus for injection material is disclosed. The injection apparatus includes a tank for storing material. The injection apparatus further includes a head body that has a surface for contacting a substrate and an opening part opened at the surface for discharging the material in fluid-communication with the tank. The injection apparatus further includes a member connected to the opening part, in which the member allows gas to flow into and flow out from the opening part.

20 Claims, 11 Drawing Sheets

Related U.S. Application Data of application No. 16/410,651, filed on May 13, 2019, now Pat. No. 11,298,769.

(51) Int. Cl.
  *B23K 1/20* (2006.01)
  *B23K 3/00* (2006.01)
  *B23K 3/06* (2006.01)
  *B23K 3/08* (2006.01)

(58) Field of Classification Search
  CPC ............ B23K 2101/34; B23K 2101/42; B23K 2103/54; B23K 3/06; B23K 3/0638
  See application file for complete search history.

(56) References Cited

U.S. PATENT DOCUMENTS

| | | | | |
|---|---|---|---|---|
| 5,129,579 | A * | 7/1992 | Conte | B05B 17/06 |
| | | | | 239/4 |
| 5,244,143 | A | 9/1993 | Ference et al. | |
| 6,231,333 | B1 | 5/2001 | Gruber et al. | |
| 6,270,019 | B1 * | 8/2001 | Reighard | B05C 5/02 |
| | | | | 239/290 |
| 7,040,549 | B2 * | 5/2006 | Ivri | A61M 11/007 |
| | | | | 239/338 |
| 7,150,412 | B2 * | 12/2006 | Wang | B05B 5/025 |
| | | | | 239/102.1 |
| 7,401,744 | B2 * | 7/2008 | Holm | B05C 11/1034 |
| | | | | 239/296 |
| 7,931,187 | B2 * | 4/2011 | Gruber | B23K 3/0638 |
| | | | | 228/256 |
| 8,740,040 | B2 * | 6/2014 | Choi | B23K 3/0623 |
| | | | | 228/256 |
| 9,346,075 | B2 * | 5/2016 | Aguilar | B05C 5/0291 |
| 9,511,438 | B2 | 12/2016 | Sato | |
| 10,932,372 | B2 * | 2/2021 | Nakamura | H05K 3/28 |
| 11,298,769 | B2 * | 4/2022 | Aoki | B23K 3/08 |
| 11,684,988 | B2 * | 6/2023 | Aoki | B23K 3/08 |
| | | | | 228/180.22 |
| 2001/0010324 | A1 * | 8/2001 | Maeda | H05K 3/3457 |
| | | | | 228/256 |
| 2002/0053606 | A1 * | 5/2002 | Mahr | F02M 61/205 |
| | | | | 239/96 |
| 2004/0217193 | A1 * | 11/2004 | Holm | B05B 17/0607 |
| | | | | 239/290 |
| 2005/0095168 | A1 * | 5/2005 | Centanni | A61L 2/07 |
| | | | | 422/27 |
| 2008/0000536 | A1 | 1/2008 | Delamarche et al. | |
| 2008/0020451 | A1 | 1/2008 | Nishiyama | |
| 2008/0073413 | A1 * | 3/2008 | Mizuno | H05K 3/3478 |
| | | | | 228/33 |
| 2008/0272177 | A1 * | 11/2008 | Cordes | H05K 3/3485 |
| | | | | 228/33 |
| 2011/0049759 | A1 * | 3/2011 | Garant | B23K 3/0623 |
| | | | | 425/563 |
| 2011/0210483 | A1 * | 9/2011 | Itoh | C03C 27/08 |
| | | | | 266/236 |
| 2011/0310179 | A1 * | 12/2011 | Ohnishi | B41J 2/04 |
| | | | | 347/44 |
| 2012/0132694 | A1 * | 5/2012 | Buchwalter | H01L 24/11 |
| | | | | 228/33 |
| 2016/0184914 | A1 | 6/2016 | Volker et al. | |
| 2017/0263498 | A1 | 9/2017 | Aoki et al. | |
| 2018/0021803 | A1 * | 1/2018 | Nauchi | B05C 5/0216 |
| | | | | 427/58 |
| 2018/0376600 | A1 * | 12/2018 | Nakamura | B05D 7/00 |
| 2022/0193805 | A1 * | 6/2022 | Aoki | B23K 3/0638 |
| 2023/0241700 | A1 * | 8/2023 | Aoki | B23K 1/20 |
| | | | | 228/180.22 |

FOREIGN PATENT DOCUMENTS

| | | |
|---|---|---|
| JP | 2000294591 A | 10/2000 |
| JP | 2001300388 A | 10/2001 |
| JP | 2007294952 A | 11/2007 |
| JP | 2016201469 A | 12/2016 |
| JP | WO2016114275 A1 | 11/2017 |
| KR | 20090078278 A | 7/2009 |
| KR | 20090078278 A1 | 7/2009 |
| WO | 2014128827 A1 | 8/2014 |

OTHER PUBLICATIONS

International Search Report issued in PCT Application No. PCT/IB2020/054214, dated Aug. 14, 2020, pp. 1-9.
International Search Report from GB2117677.1 dated Nov. 11, 2022, 3 pages.
Notice of Reasons for Refusal from JP2021-567776 dated Nov. 10, 2023. (3 pages).
Office Action from DE 112020002336.4 dated Feb. 23, 2024 (10 pages).

* cited by examiner

PREVENTION OF DRIPPING OF MATERIAL FOR MATERIAL INJECTION

BACKGROUND

The present disclosure, generally, relates to material injection technology, more particularly, to an injection apparatus, a method and a material injection system for injecting material.

In recent years, demands for higher density packaging are increasing. Fine pitch interconnect with solder bump is a key technology to achieve high density packaging for 2.5D or 3D and mobile applications. As the solder bump size is getting smaller for fine pitch applications, control of the solder interconnect properties affect chip package interaction (CPI) and electro-migration (EM) performance.

SUMMARY

According to an embodiment of the present invention, an injection apparatus for injecting material is provided. The injection apparatus includes a tank for storing material. The injection apparatus also includes a head body that has a surface for contacting a substrate and an opening part opened at the surface for discharging the material in fluid-communication with the tank. The injection apparatus further include at least one member connected to the opening part, in which the at least one member allows gas to flow into and flow out from the opening part.

According the injection apparatus of the embodiment of the present invention, since the at least one member is configured to allow gas to flow into and flow out from the opening part for discharging the material even when the opening part is covered by the substrate, it becomes possible to vacate a space of the opening part smoothly and easily by transferring the material to the tank while taking gas into the opening part through the at least one member. Thus, it is possible to avoid dripping of the material from the opening part of the injection apparatus without degrading process productivity.

In a preferable embodiment, the opening part has a form of a slit and each of the at least one member is connected to the opening part at a position away from a middle of the slit. Since the slit like opening covers wide area of the substrate in one scan, it is possible to improve the process productivity.

In a preferable embodiment, the at least one member includes a second tank equipped with a valve for opening and closing a channel between the second tank and an outside. Thereby, transferring of the material to fill or vacate the opening part may be conducted smoothly. Also, the at least one member may be used with almost the same life span as the injection apparatus. Furthermore, there is no need to form a hole that has a risk of being clogged by the material.

In a particular embodiment, the head body includes a first connection channel connected to the tank and a second connection channel connected to the second tank. The opening part has a first end connected to the first connection channel and a second end connected to the second connection channel.

In other preferable embodiment, each of the at least one member includes a porous member that allows the gas to flow therethrough while separating the gas from the material. Thereby, mechanism to avoid dripping of material from the opening part while keeping the material in the opening part may be provided in a simple manner. Since the opening part can be filled or vacated simply by transferring of the material merely in the opening part, it is possible to shorten transfer time of the material.

In further other preferable embodiment, each of the at least one member includes one or more holes opened at the head body that allows the gas to flow therethrough. Thereby, mechanism to avoid dripping of material from the opening part may be provided in a simple manner with low cost. Since the opening part can be filled or vacated simply by transferring of the material merely in the opening part, it is possible to shorten transfer time of the material.

In a particular embodiment, the tank is equipped with an open and close element. The open and close element is configured to be opened or closed and connected to ambient environment, a positive pressure line or a vacuum line depending on an operation status. In a particular embodiment, the injection apparatus is configured to be scanned on the substrate with the opening part covered by the substrate and filled with the material. In a particular embodiment, the injection apparatus is configured to be lifted up from the substrate in response to transfer of the material from the opening part to the tank being completed and the tank being sealed or vacuumed.

In a preferable embodiment, the material is molten solder, the injection apparatus is an injection molded soldering (IMS) head and the molten solder is injected into a hole or cavity formed at the surface of the substrate. Since the material is molten solder, thus the injection apparatus generally operates at high temperatures. Thus, ways of preventing the material from dripping from the opening part would be limited. The injection apparatus according to the embodiment of the present invention implements practical solution to avoid dripping of the molten solder from the opening part in a situation where available ways are limited. Also since transferring of the material to the tank is conducted fast and smoothly in comparison with a case where solder is solidified before movement of the injection apparatus from the substrate, degradation of process productivity is expected to be minimized.

According to other embodiment of the present invention, a method for injecting material is provided. The method includes placing an injection apparatus onto a substrate. The injection apparatus includes a tank for storing material; a head body having a surface in contact with the substrate and an opening part opened at the surface and covered by the substrate; and at least one member connected to the opening part. The at least one member allows gas to flow therethrough. The method also includes discharging material from the opening part. The method further includes transferring material filled in the opening part to the tank of the injection apparatus while taking gas into the opening part through the at least one member.

According the method of the embodiment of the present invention, since the material in the opening part is transferred to the tank while taking gas into the opening part through the at least one member, it is possible to vacate a space of the opening part smoothly and easily, thereby avoiding dripping of material from the opening part of the injection apparatus without degrading process productivity.

In a particular embodiment, the method further includes sealing the tank with an open and close element closed or vacuuming the tank with the open and close element opened at least in part in response to the material being transferred from the opening part to the tank. The method also includes lifting up the injection apparatus from the substrate in response to the tank being sealed or vacuumed. Even if there is a tiny level difference between the surface of the substrate and a place where the injection apparatus is retracted to wait for replacement of the substrate, it is possible to retract the injection apparatus smoothly.

According to other embodiment of the present invention, a material injection system for injecting material is provided. The material injection system includes a stage for receiving a substrate; an injection apparatus, a position controller; and a flow controller. The injection apparatus includes a tank for storing material. The injection apparatus also includes a head body that has a surface for contacting the substrate on the stage and an opening part opened at the surface for discharging the material in fluid-communication with the tank. The injection apparatus further include at least one member connected to the opening part. The at least one member allows gas to flow in to and flow out from the opening part. The position controller is configured to control a relative position of the injection apparatus with respect the substrate on the stage. The flow controller is configured to control a flow of material.

According the material injection system of the embodiment of the present invention, since the at least one member of the injection apparatus is configured to allow gas to flow in to and flow out from the opening part, it is possible to vacate a space of the opening part by transferring the material to the tank while taking gas into the opening part through the at least one member. Thus, it is possible to avoid dripping of material from the opening part of the injection apparatus without degrading process productivity.

In a particular embodiment, the position controller is further configured to place the injection apparatus onto the substrate. The flow controller is also configured to discharge material from the opening part of the injection apparatus. The flow controller is further configured to transfer material filled in the opening part to the tank of the injection apparatus while taking the gas into the opening part through the at least one member.

In a particular embodiment, the position controller is further configured to lift up the injection apparatus from the substrate in response to the tank being sealed or vacuumed. The position controller is further configured to move the injection apparatus out of the substrate in response to the injection apparatus being lifted. The position controller is further configured to move the injection apparatus onto a new substrate in response to the new substrate being placed on the stage. In a particular embodiment, the material injection system further includes a positive pressure line configured to be connected to the tank of the injection apparatus. The positive pressure line provides pressure to push the material stored in the tank to the opening part during scanning of the injection apparatus.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings. Note that the sizes and relative positions of elements and layers in the drawings are not necessarily drawn to scale. Some of these elements or layers are arbitrarily enlarged and positioned for improving legibility of drawing.

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to an injection apparatus, a method and a material injection system for injecting material to a substrate.

Hereinafter, with reference to a series of FIGS. 1A, 1B, and 1C, an injection apparatus according to an exemplary embodiment of the present invention is described, in which the material to be injected by the injection apparatus is molten solder and the substrate to be injected with the material is a semiconductor, glass or organic substrate that has one or more holes or cavities at the surface of the substrate (as a part of the substrate itself or a temporary member placed on the substrate such as resist mask). Thus, the injection apparatus according to the exemplary embodiment of the present invention, which will be described below, is an IMS (Injection Molded Soldering) head 10 used for an IMS process. However, the injection apparatus is not limited to the IMS head 10, any injection apparatus for injecting any liquid or paste material to a target substrate is contemplated.

In some embodiments, the IMS can be employed to bump and fill material. An injection apparatus can be scanned on a substrate and molten solder can be injected from an opening of the injection apparatus that is formed under a tank to fill a cavity or a hole formed at the surface of the substrate. The IMS technology has various advantages, including solder composition flexibility, fine pitch capability, green technology and low cost process. The composition flexibility even at very fine pitch and small size would lead desired mechanical properties and EM resistance.

In some embodiments, solder can be solidified before movement of the injection apparatus from the substrate. For example, an injection head for supplying molten solder that has a nozzle can be brought into contact with a mask with openings that is disposed over a substrate. After completing a supply operation, the injection head can be forcedly cooled by heat transfer from a cooling unit through a heater unit whose operation has been stopped. Molten solder in the cooled injection head does not drool from the nozzle when the injection head moves up.

Figure 1A:
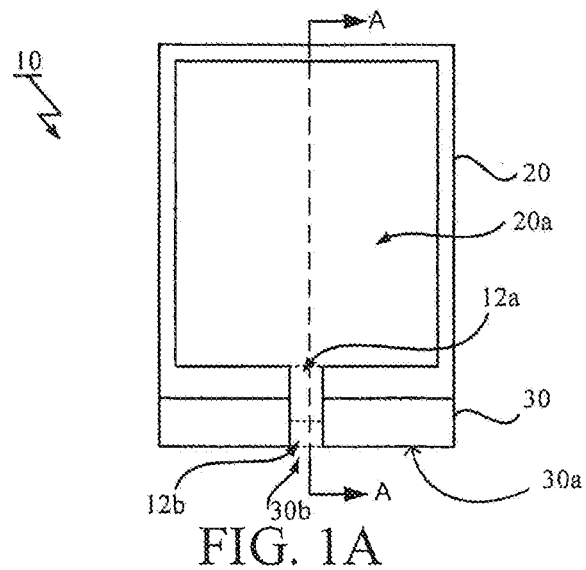
FIGS. 1A, 1B and 1C illustrate cross sectional views and a bottom view of an IMS (Injection Molded Soldering) head used for injecting molten solder to a target substrate according to an exemplary embodiment of the present invention.
Figure 1B:
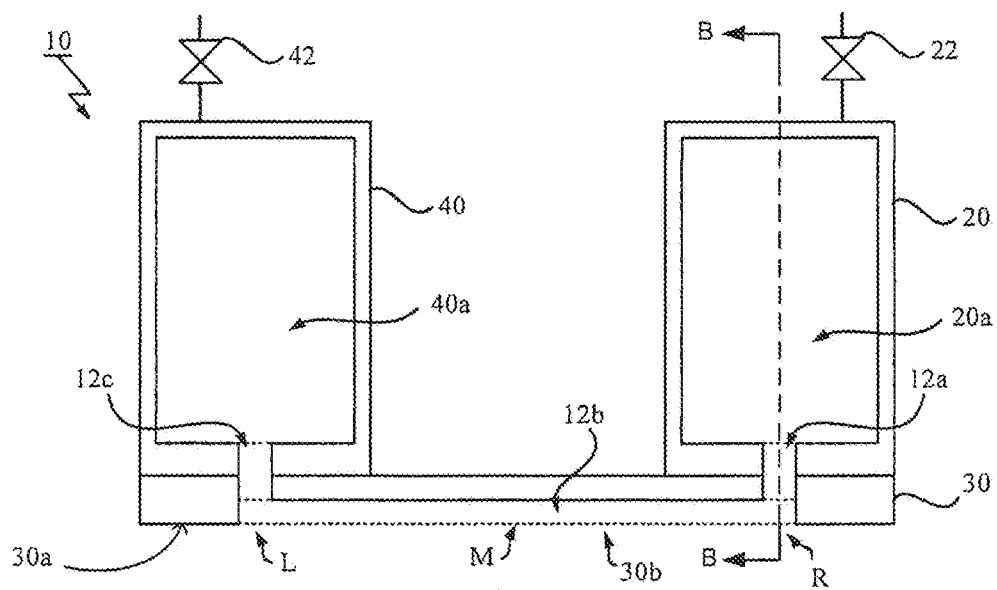
Figure 1C:
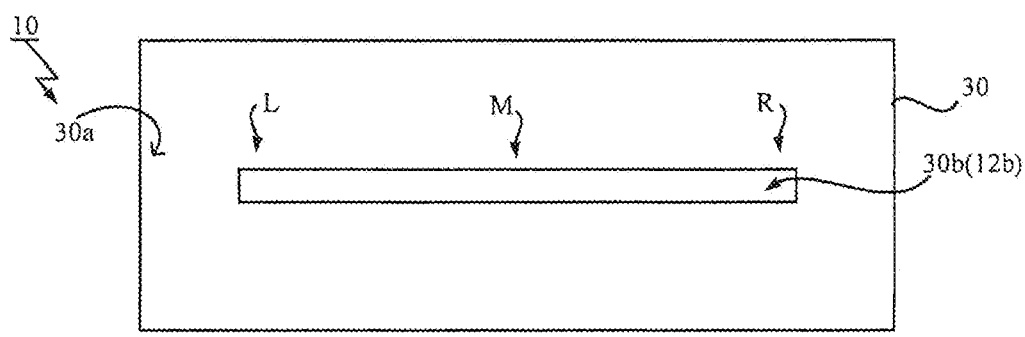

FIGS. 1A, 1B and 1C illustrate views of the IMS head 10 used for injecting molten solder to a target substrate. FIGS. 1A and 1B show cross-sectional views of the IMS head 10 as viewed from different sides, respectively. FIG. 1C shows a bottom view of the IMS head 10. Note that the cross-sectional view shown in FIG. 1A corresponds to a cross-section indicated by "B" in the other cross sectional view shown in FIG. 1B. Also note that the cross-sectional view shown in FIG. 1B corresponds to a cross-section indicated by "A" in the cross sectional view shown in FIG. 1A.

As shown in FIGS. 1A and 1B, the IMS head 10 includes a first tank 20 for storing molten solder; a head body 30 for contacting the target substrate and for injecting molten solder to the target substrate; and a second tank 40 for storing molten solder at least temporarily. The head body 30 may be formed under the two tanks 20, 40. Note that the IMS head 10 may include an appropriate heating member such as a heating wire and a thermocouple at appropriate position. The heating member is used to control temperature of the IMS head 10, accordingly the temperature and the state of the solder retained in the IMS head 10. Thus, the solder retained in the IMS head 10 is molten solder during the operation of the IMS process.

The head body 30 has a bottom surface 30a for contacting the target substrate and an opening 30b opened at the bottom surface 30a for discharging the molten solder in fluid-communication with the first tank 20. In a particular embodiment, the bottom surface 30a of the head body 30 is pressed against the target substrate during scanning. The head body 30 and the tanks 20, 40 may be made of rigid metal material such as stainless. The head body 30 may include a cushion layer at the bottom surface 30a so as to absorb pressure against the target substrate with some extent. The cushion layer may be made of elastic material such as rubber that has a heat-resistant.

The first tank 20 has an inner space 20a where the molten solder is stored. The second tank 40 also has an inner space 40a where the molten solder is stored. One of these tanks 20, 40, which is first tank 20 in the described embodiment, may be connected to an external solder provision device. The inner space 20a of the first tank 20 and the inner space 40a of the second tank 40 are in fluid communication with each other through one flow channel 12 formed in the IMS head 10.

The one flow channel 12 includes an opening part 12b corresponding to the opening 30b opened at the bottom surface 30a; a first connection channel 12a connected to the first tank 20 and the opening part 12b; and a second connection channel 12c connected to the second tank 40 and the opening part 12b.

As shown in FIG. 1C, in the described embodiment, the opening part 12b (and the opening 30b) has a form of a slit (a long, straight, narrow opening) that may extends along the bottom surface 30a in one direction. The width of the slit like opening part 12b may be, but is not limited to, in a range of 0.2 to 5.0 mm.

In some embodiments, a slit like opening shape can be employed to improve process productivity. The slit like opening shape can cover a wide area of a substrate in a single scan. In some embodiments, an injection apparatus can be moved out of the substrate on a stage and then the next substrate is set on the stage.

The first tank 20 and the second tank 40 are connected to the opening part 12b at positions away from a middle M of the slit, respectively. In the embodiment described in FIGS. 1B and 1C, the opening part 12b may have a first end R connected to the first connection channel 12a that is further connected to the first tank 20 and a second end L connected to the second connection channel 12c that is further connected to the second tank 40. In the described embodiment, the first connection channel 12a and the second connection channel 12c have tube like shapes and extend perpendicularly to the bottom surface 30a. The sizes of the first connection channel 12a and the second connection channel 12c are not limited and may be larger than the width of the opening part 12b.

The first tank 20 may be equipped with a first on-off valve 22 as an open and close element for opening and closing a channel between the first tank 20 and an outside of the IMS head 10. The first on-off valve 22 may be connected to the top of the first tank 20. The first on-off valve 22 may be configured to be opened or closed and connected to ambient environment, a positive pressure line or a vacuum (negative pressure) line in a manner depending on an operation status of the IMS process.

In some embodiments, to avoid dripping of the material, vacuum function may be employed. For example, a fluid discharge device, such as a solder bump forming device using a IMS method, can discharge a fluid without cooling the head, and adjust the pressure to be added to the fluid, thereby preventing leakage of an excess fluid from the nozzle, and that it is effective to switch a positive pressure and a negative pressure to achieve this. A short slit may help to prevent dripping.

The second tank 40 may be equipped with a second on-off valve 42 for opening and closing a channel between the second tank 40 and an outside of the IMS head 10. The second on-off valve 42 may be connected to the top of the second tank 40. The second on-off valve 42 may be configured to be opened or closed and connected to ambient environment or a positive pressure line in a manner depending on the operation status of the IMS process.

The second on-off valve 42 allows gas such as air and inert gas (e.g., nitrogen, noble gases such as argon) to flow in to the second tank 40 and to flow out from the second tank 40. The gas flowing into the inner space 40a of the second tank 40 through the second on-off valve 42 may further flow into the second connection channel 12c, the opening part 12b and the first connection channel 12a to push the molten solder back to the first tank 20 even when the opening 30b (the opening part 12b) is covered by the target substrate.

In the embodiment described in FIGS. 1A, 1B, and -1C, thus, the second tank 40 equipped with the second on-off valve 42 works as a member that is connected to the opening part 12b and allows the gas to flow in to and flow out from the opening part 12b especially when transferring the molten solder between the opening part 12b and the first tank 20.

The IMS head 10 shown in FIGS. 1A, 1B, and 1C may be configured to be scanned on the target substrate with the opening part 12b covered by the surface of the target substrate and filled with the molten solder. During scanning or contacting of the IMS head 10 on the target substrate, the molten solder is retained in the opening part 12b as well as the two tanks 20, 40. And the molten solder is injected from the opening part 12b into a hole or cavity formed at the surface of the target substrate. Also the IMS head 10 may be configured to be lifted up from the target substrate in order to replace the target substrate with a new target substrate. During lift up of the IMS head 10, the molten solder has been moved to the first tank 20 and no molten solder is left in the opening part 12b. Only gas such as air or inert gas exists in the opening part 12b. If necessary, the first on-off valve 22 may be connected to the vacuum (negative pressure) line to perform vacuum function to keep the solder in the first tank 20 of the IMS head 10.

Note that the IMS head 10 may further include other slit opening at the bottom surface 30a for vacuuming air in the hole or cavity formed at the surface of the target substrate. It is preferable when the size of the hole or cavity is fine.

With reference to a series of FIGS. 2A, 2B, and 2C, FIGS. 3A, 3B, and 3C and FIGS. 4A, 4B, 4C, 4D, 4E, and 4F, an IMS process using the IMS head 10 according to the exemplary embodiment of the present invention is described.

FIGS. 2A, 2B and 2C and FIGS. 3A, 3B and 3C illustrate cross sectional views of the IMS head 10 in each step of the IMS process. FIGS. 4A, 4B, 4C, 4D, 4E, and 4F illustrate bottom views of the IMS head 10 in each step of the IMS process. Note that the bottom views shown in FIGS. 4A, 4B, and 4C correspond to the cross sectional views of the IMS head 10 shown in FIGS. 2A, 2B, and 2C, respectively. The bottom views shown in FIGS. 4D, 4E, and 4F correspond to the cross sectional views of the IMS head 10 shown in FIGS. 3A, 3B, and 3C, respectively.

Figure 2A:
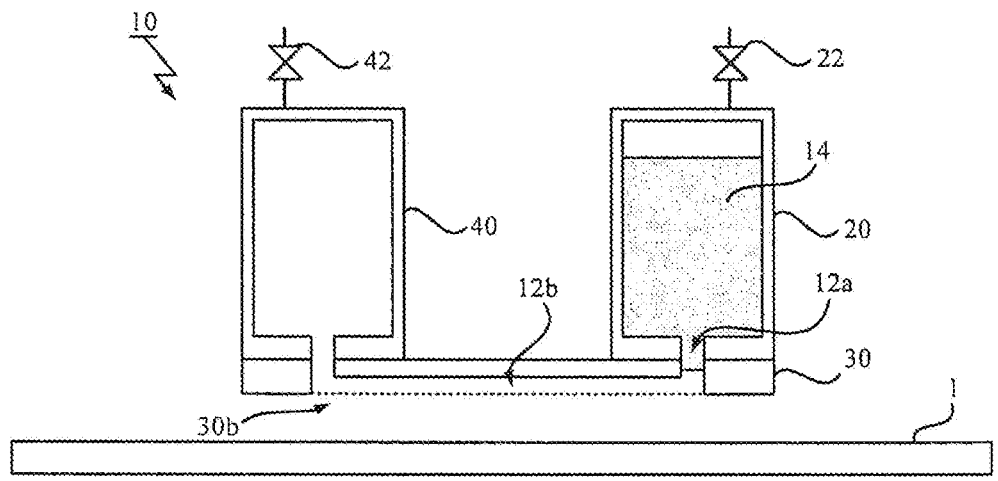
FIGS. 2A, 2B and 2C illustrate cross sectional views of the IMS head in each step of an IMS process according to the exemplary embodiment of the present invention.
Figure 4A:
FIGS. 4A, 4B, 4C, 4D, 4E, and 4F illustrate bottom views of the IMS head in each step of the IMS process according to the exemplary embodiment of the present invention.

As shown in FIG. 2A and FIG. 4A, the IMS process may include a step of initiating the IMS process with the IMS head 10 lifted over a target substrate 1. In the step of initiating the IMS process, a predetermined amount of molten solder 14 is stored in the first tank 20. The first on-off valve 22 is closed when all solder 14 exists in the first tank 20 and the first connection channel 12a. Note that the second on-off valve 42 may be either open or closed in this step.

The molten solder 14 is solder material that may have any appropriate composition. In one or more embodiments, any of lead-free solder alloys including binary, ternary and quaternary systems of one or more elements selected from a group including tin, bismuth, silver, indium, antimony, copper, zinc, nickel, aluminum, manganese and palladium, may be used. Such a lead-free solder alloys may include Bi—Sn, Sn—Ag, Sn—Ag—Bi, Sn—Ag—Cu, Sn—Cu alloys, to name but a few. With the high degree of freedom regarding composition, any composition suitable for bumping or filling may be selected.

In the initial step, a position of a top surface of the molten solder 14 goes down by weight of the solder 14 itself, while pressure of void in the first tank 20 decreases, until pressure at the bottom surface of the molten solder 14 is equal to atmospheric pressure. The molten solder 14 may enter the first connection channel 12a at least in part. Note that the stop position of the bottom surface of the molten solder 14 may be controlled by volume of the solder and dimensions of the IMS head 10.

In other embodiment, the stop position may also be controlled by adding vacuum function. When the vacuum function is employed, the first on-off valve 22 connected to the first tank 20 is open and connected to the vacuum line.

Figure 2B:
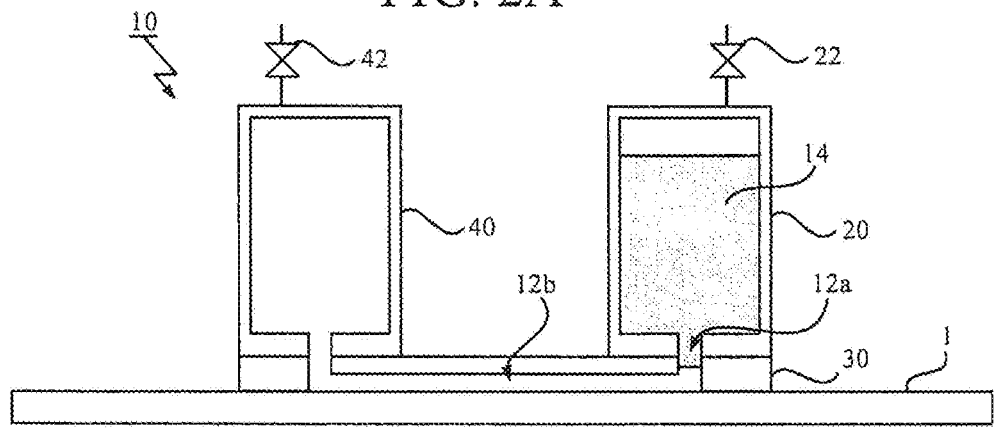
Figure 4B:
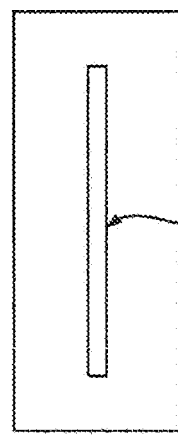

As shown in FIG. 2B and FIG. 4B, the IMS process may also include a step of placing the IMS head 10 onto the target substrate 1 so that the bottom surface 30a of the head body 30 is in contact with the surface of the target substrate 1 and the opening part 12b opened at the bottom surface 30a is covered by the surface of the target substrate 1. The IMS head 10 is pushed onto the target substrate 1 by appropriate pressure. The states of the first on-off valve 22 and the second on-off valve 42 may be same as that in the step of initiating the IMS process.

Figure 2C:
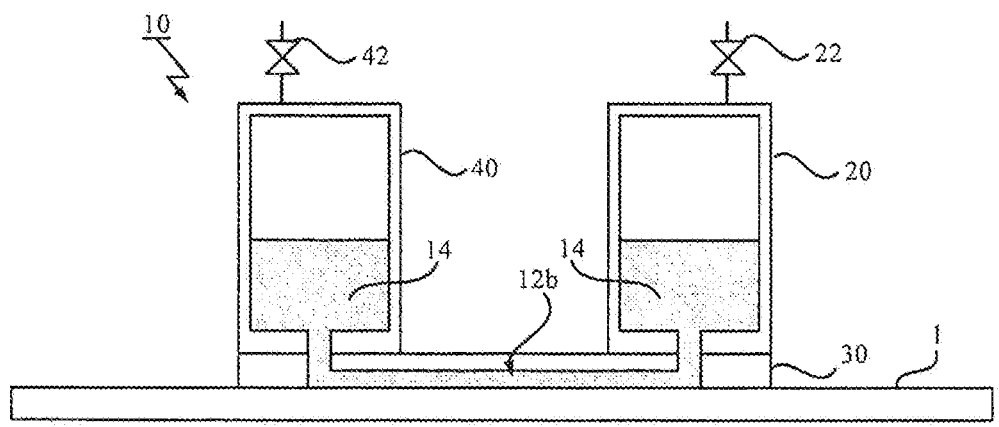
Figure 4C:
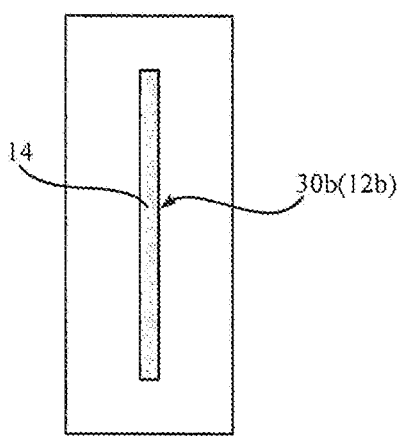

As shown in FIG. 2C and FIG. 4C, the IMS process may also include a step of providing molten solder 14 to the opening part 12b of the head body 30 from the first tank 20. In the step of providing the molten solder 14 to the opening part 12b, the first on-off valve 22 and the second on-off valve 42 are open and inert gas (e.g., nitrogen gas) flows from the positive pressure line into the first tank 20 via the first on-off valve 22, and the molten solder 14 retained in the first tank 20 is pushed into the first connection channel 12a, the opening part 12b and the second connection channel 12c and the second tank 40 in that order. During this step, the IMS head 10 may be pushed to the target substrate 1 by appropriate pressure. As shown in FIG. 4C, the opening part 12b of the IMS head 10 is fully filled with the molten solder 14. Since the second tank 40 equipped with the second on-off valve 42 that is in fluid-communication with the opening part 12b allows gas to flow therethrough, during the transfer of the molten solder 14, the second on-off valve 42, which is open in this operation status, releases the gas flowing from the opening part 12b to ambient environment. The void in the second tank 40 helps to prevent the molten solder from reaching the second on-off valve 42.

After the opening part 12b of the IMS head 10 is fully filled with the molten solder 14, the first on-off valve 22 and the second on-off valve 42 are open and connected to ambient environment to make both positions of liquid surface of the molten solder 14 in the first and second tanks 20, 40 equal. However, note that the positions or levels of the liquid surface of the molten solder 14 in the first and second tanks 20, 40 do not need to be equal.

Figure 3A:
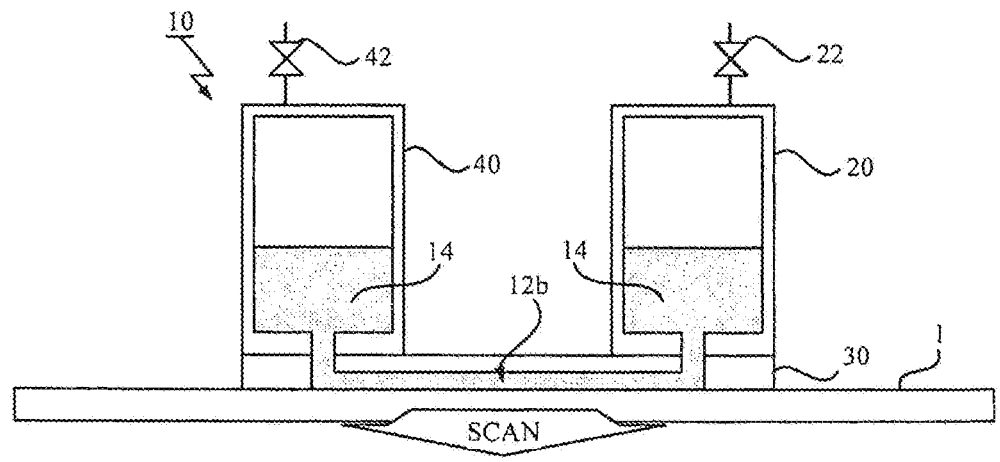
FIGS. 3A, 3B and 3C illustrate other cross sectional views of the IMS head in each step of the IMS process according to the exemplary embodiment of the present invention.
Figure 4D:
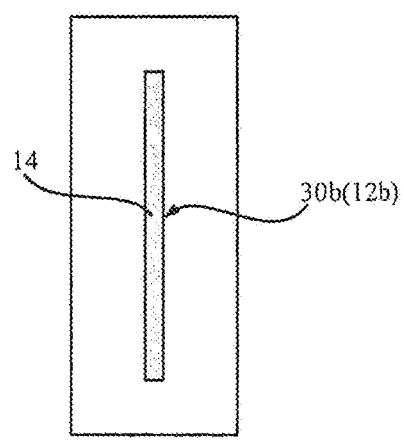

As shown in FIG. 3A and FIG. 4D, the IMS process may further include a step of discharging the molten solder 14 from the opening part 12b (and opening 30b) of the IMS head 10 to the target substrate 1 while scanning the IMS head 10 on the target substrate 1 in the horizontal plane. In the step of discharging the molten solder 14 from the opening part 12b, the first on-off valve 22 and the second on-off valve 42 are open and connected to the positive pressure line so that pressure is applied to both of the top surfaces of the molten solder 14 in the first tank 20 and the second tank 40. After the IMS scan is completed for this target substrate 1 currently mounted on the stage, the first on-off valve 22 and the second on-off valve 42 are then opened and connected to ambient environment.

Figure 3B:
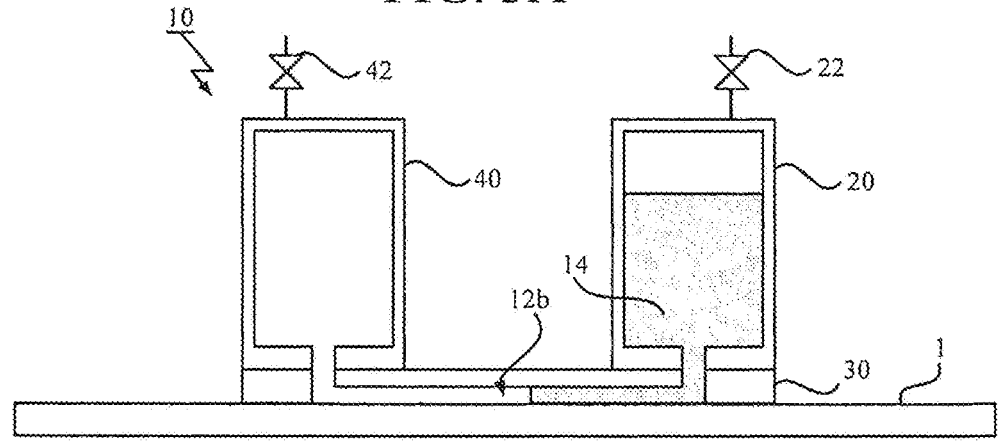
Figure 4E:
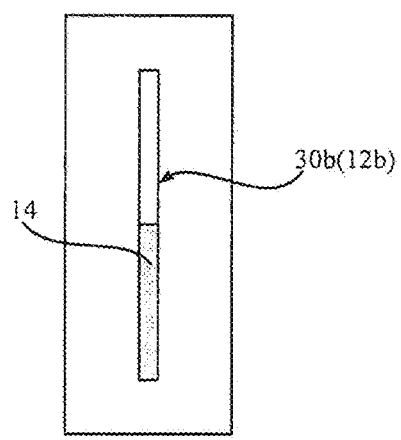

As shown in FIG. 3B and FIG. 4E, the IMS process may include further a step of transferring the molten solder 14 filled in the opening part 12b to the first tank 20 of the IMS head 10 while taking gas into the opening part 12b through the second tank 40 and the second on-off valve 42. In the step of transferring the molten solder 14 to the first tank 20, the first on-off valve 22 is open and connected to ambient environment and the second on-off valve 42 is open and connected to the positive pressure line. The molten solder 14 in the second tank 40 is pushed back into the first tank 20 through the one flow channel 12 while releasing the gas in a void of the inner space 20a of the first tank 20 to an outside of the IMS head 10 through the first on-off valve 22. During this step, the IMS head 10 may be pushed to the target substrate 1 by appropriate pressure.

Alternatively, the first on-off valve 22 is open and connected to a negative pressure line and the second on-off valve 42 is open and connected to ambient environment. In this case, the molten solder 14 in the second tank 40 is drawn to the first tank 20 through the one flow channel 12 while taking the gas into the inner space 40a of the second tank 40 through the second on-off valve 42. In this case, the negative pressure line is included.

Figure 3C:
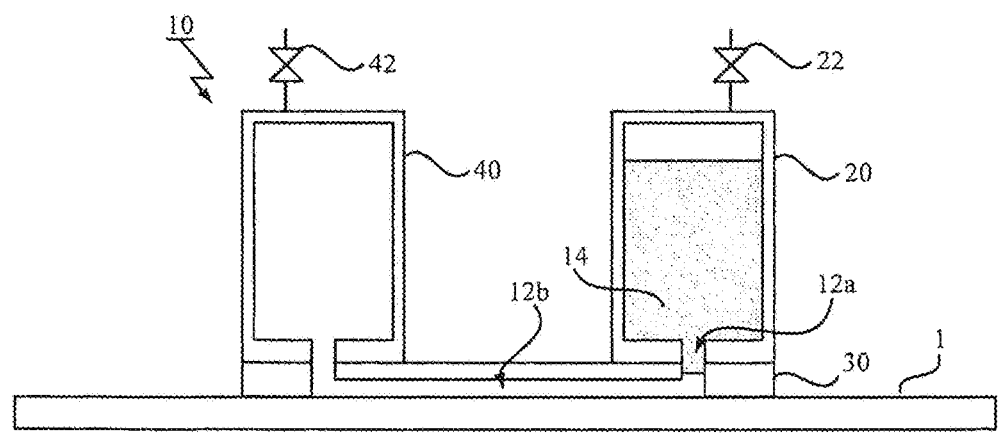
Figure 4F:
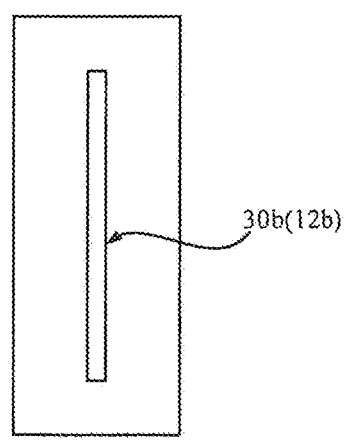

As shown in FIG. 3C and FIG. 4F, after the transfer of the molten solder 14 to the first tank 20 is complete, a space of the opening part 12b becomes vacant. The IMS process may include a step of sealing the first tank 20 with the first on-off valve 22 closed when the molten solder 14 has been transferred from the opening part 12b to the first tank 20. If vacuum is included to keep all molten solder 14 in the first tank 20 and the first connection channel 12a, the first on-off valve 22 is connected to the sack back line. Thus, alternatively, IMS process may include a step of vacuuming the first tank 20 with the first on-off valve 22 opened at least in part and connected to the vacuum line.

Then, the IMS process goes back to the step shown in FIG. 2A and FIG. 4A. With reference to FIG. 2A and FIG. 4A again, the IMS process may further include a step of lifting up the IMS head 10 from the target substrate 1 when the first tank 20 is sealed or vacuumed. During the lift up of the IMS head 10, the target substrate 1 would be exchanged with a new target substrate by moving the IMS head 10 out of the target substrate 1, replacing the target substrate 1 with the new target substrate; and moving the IMS head 10 onto the new target substrate.

Hereinafter, with reference to FIGS. 5A and 5B, use cases of the IMS process using the IMS head 10 according to one or more particular embodiments of the present invention are described.

Figure 5A:
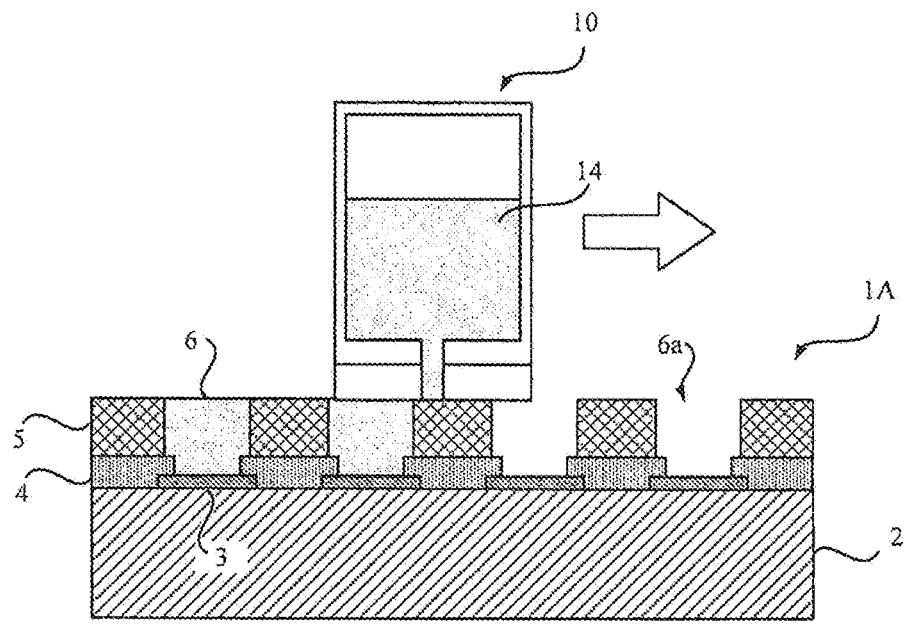
FIGS. 5A and 5B illustrate examples of use cases of the IMS process using IMS a head according to one or more particular embodiments of the present invention.

FIG. 5A illustrates a use case of the IMS process using the IMS head 10 to fabricate a solder bumping. FIG. 5A shows an example of a target substrate 1A to be injected with the molten solder. As shown in FIG. 5A, the target substrate 1A includes a base organic substrate 2 and a plurality of electrodes 3 formed on the surface of the base organic substrate 2 and a solder resist 4 that covers the base organic substrate 2 with its openings being aligned to the electrodes 3. The target substrate 1A further includes a resist mask 5 that has openings aligned to the electrodes 3.

As shown in FIG. 5A, by scanning the IMS head 10 on the target substrate 1A, solder bumps 6 are formed in the opening 6a of the resist mask 5. After forming the solder bumps 6, the resist mask 5 may be stripped from the target substrate 1A. Hence, the resist mask 5 is a temporary member. Then, the solder bumps 6 may be optionally subjected to reflow. Note that in the FIG. 5A, the target substrate 1A has been described as an organic based substrate such as laminates or PCB (Printed Circuit Board). However, the target substrate 1A where solder bumps are fabricated is not limited to the organic based substrate. In other embodiment, a semiconductor substrate (e.g., silicon chip or wafer) may also be contemplated.

Figure 5B:
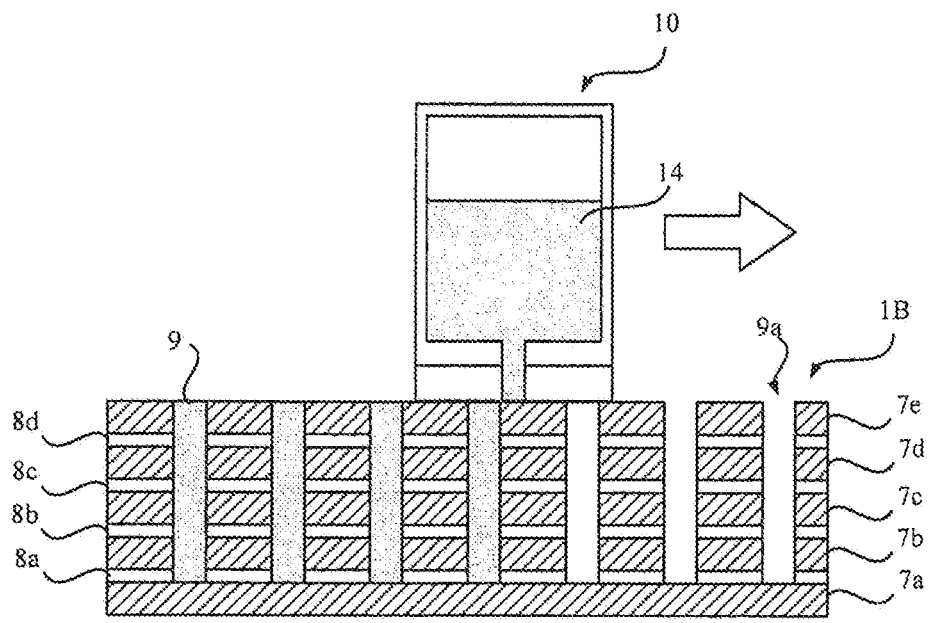

FIG. 5B illustrates other use case of the IMS process to filling a through via hole formed through the target substrate 1. FIG. 5A shows other example of a target substrate 1B to be injected with the molten solder. As shown in FIG. 5B, the target substrate 1B includes a plurality of stacked substrate layers 7a, 7b, 7c, 7d, and 7e and a plurality inter-layer adhesive 8a, 8b, 8c, and 8d formed between the stacked substrate layers 7a, 7b, 7c, 7d, and 7e. There is a plurality of through via holes 9a, each of which is formed through one or more substrate layers 7 in the target substrate 1B.

As shown in FIG. 5B, by scanning the IMS head 10 on the target substrate 1B, a plurality of solder vias 9 are formed in the through via holes 6a of the stacked substrate layer 7b, 7c, 7d, and 7e. Note that in the FIG. 5B, the target substrate 1B has been described as a semiconductor based substrate. However, the target substrate 1B where through vias are fabricated is not limited to the semiconductor based substrate. In other embodiment, glass based substrates may also be contemplated.

Although the specific target substrates 1 for the IMS process have been described with reference to FIGS. 5A and 5B, the target substrate 1 for the IMS process according to one or more embodiments of the present invention is not limited. Any substrates may be used as the target substrate 1.

Figure 6:
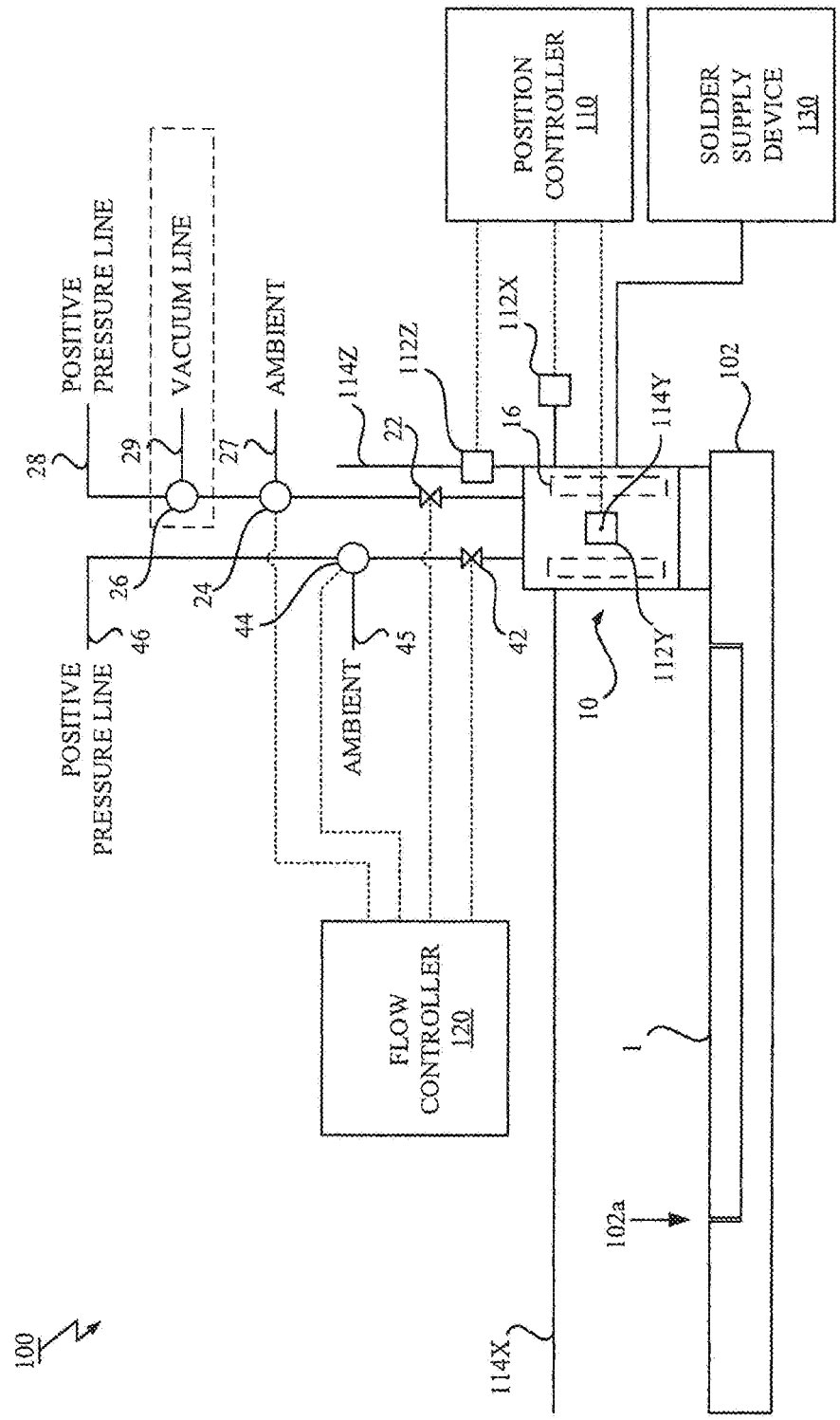
FIG. 6 illustrate a schematic of an IMS system including a IMS head for injecting molten solder according to an exemplary embodiments of the present invention.

With reference to FIG. 6, an IMS system 100 including the IMS head 10 for injecting molten solder according to an exemplary embodiments of the present invention is described. As shown in FIG. 6, the IMS system 100 includes a stage 102 for receiving a target substrate 1; the IMS head 10 as described in FIG. 1; a position controller 110 configured to control a relative position of the IMS head 10 with respect the target substrate 1 on the stage 102; a flow controller 120 configured to control a flow of the molten solder and a solder supply device 130 for supplying the molten solder to the IMS head 10 (its first tank 20). The IMS head 10 shown in FIG. 6 includes a heating member 16 controlled by an appropriate heat controller. The heating member 16 may be provided near each of the tanks 20, 40. The IMS head 10 is heated to an operation temperature (e.g., 230 Celsius degrees~for Su-3.0Ag-0.5Cu (SAC305) solder) above the solder melting temperature.

In a particular embodiment, the stage 102 may include a recess in which the target substrate 1 fits as shown in FIG. 6. The stage 102 may include a heating member for warming the target substrate 1 to appropriate temperature. There is generally a tiny gap 102a between the target substrate 1 and the top surface of the stage 102 on which the IMS head 10 retracts. Also there is generally a tiny level difference between the top surface of the target substrate 1 and the top surface of the stage 102. Since the diameter of the hole or cavity may be in a range from 50-200 micrometers, it is difficult to eliminate the level difference sufficiently as compared to the diameter of the hole or cavity. So, in order to retract the IMS head 10 to the top surface of the stage 102 outside the target substrate 1, the IMS head 10 is lifted up before crossing the gap and steps. Generally, there is a risk that the molten solder in the IMS head 10 would drip from the opening part 12b onto the surface of the target substrate 1 and into the tiny gap 102a between the target substrate 1 and the stage 102.

As shown in FIG. 6, the IMS system 100 may further include actuators 112X, 112Y, 112Z provided to the IMS head 10 so as to move the IMS head 10 along respective guides of three axes 114X, 114Y, 114Z. Actuators used as the actuators 112 may include an electric motor, a hydraulic cylinder, to name but a few. The position controller 110 is connected to the actuators 112X, 112Y, 112Z through signal lines and the position controller 110 is configured to control the relative position of the IMS head 10 with respect the target substrate 1 on the stage 102 by sending signals to the actuators 112X, 112Y, 112Z such that the IMS head 10 appropriately moves along the guides 114X, 114Y, 114Z. Scanning, lifting up, putting down and moving of the IMS head 10 is conducted by using the actuators 112X, 112Y, 112Z and respective guides of predetermined axes, 114X, 114Y, 114Z and appropriate encoders.

As shown in FIG. 6, the IMS head 10 is connected to the first on-off valve 22 and the second on-off valve 42.

The first on-off valve 22 may be connected to a three-way valve 24 that selects a port connected to ambient environment 27 or a port connected to a positive pressure line 28 depending on a signal transmitted from the flow controller 120. The positive pressure line 28 is configured to be connected to the first tank 20 of the IMS head 10. The positive pressure line 28 may be connected to a pressure pump and provide pressure to push the molten solder stored in the first tank 20 to the opening part 12b (accordingly discharge it to outside of the IMS head 10) during scanning of the IMS head 10. The positive pressure line 28 may also provide pressure to push the molten solder stored in the first tank 20 to the second tank 40 through the opening part 12b during providing of the molten solder to the opening part 12b.

In a preferable embodiment where the vacuum function is employed, there is other three-way valve 26 that selects further the port connected to the positive pressure line 28 or a port connected to a vacuum (negative pressure) line 29 depending on a signal transmitted from the flow controller 120. The vacuum line 29 is configured to be connected to the first tank 20 of the IMS head 10. The vacuum line 29 may be connected to a pressure reducing device and provide negative pressure to vacuum the gas in the first tank 20 and keep the molten solder stored in the first tank 20 during the lift up of the IMS head 10. Note that if the vacuum function is not necessary, the cost would be reduced by omitting the vacuum (negative pressure) line 29, the three-way valve 26 and other incidental equipment for providing negative pressure if possible.

The second on-off valve 42 may be connected to a three-way valve 44 that selects a port connected to ambient environment 45 or a port connected to a positive pressure line 46 depending on a signal transmitted from the flow controller 120. The positive pressure line 46 is configured to be connected to the second tank 40 of the IMS head 10. The positive pressure line 46 may be connected to a pressure pump and provide pressure to push the molten solder stored in the second tank 40 to the opening part 12b (accordingly discharge it to outside of the IMS head 10) during scanning of the IMS head 10. The positive pressure line 46 may also provide pressure to push back the molten solder stored in the second tank 40 to the first tank 20 through the opening part 12b during transferring of the molten solder between the tanks 20, 40.

The position controller 110 is configured to place the IMS head 10 onto the target substrate 1. The position controller 110 is also configured to lift up the IMS head 10 from the target substrate 1 in response to the first tank 20 being sealed or vacuumed. The position controller 110 is further configured to move the IMS head 10 out of the target substrate 1 in response to the IMS head 10 being lifted. The position controller 110 is further configured to move the IMS head 10 onto a new substrate 1 in response to the new substrate 1 being placed on the stage 102.

The flow controller 120 is configured to provide the molten solder from the first tank 20 to the opening part 12b of the IMS head 10. The flow controller 120 is configured to discharge the molten solder from the opening part 12b of the IMS head 10. The flow controller 120 is configured to transfer the molten solder filled in the opening part 12b to the first tank 20 of the IMS head 10 while taking the gas into the opening part 12b through the second tank 40 and the second on-off valve 42 so as to vacate the space of the opening part 12b.

The solder supply device 130 is configured to supply molten solder to the IMS head 10 (the first tank 20). When the amount of the molten solder retained in the IMS head 10 falls below a predetermined threshold, the solder supply device 130 supplies the molten solder to the IMS head 10 (the first tank 20) until the amount exceeds a predetermined threshold.

As described above, the IMS head 10 has been described to move with respect to the target substrate 1 on the stage 102, which is fixed, by using the actuators 112 and the guides 114. However, way of controlling the relative position of the IMS head 10 with respect the target substrate 1 on the stage is not limited. In other embodiment, the stage 102 may be moved with respect to the IMS head 10, which is fixed, by using appropriate actuators and guides.

As described above, during the lift up of the IMS head 10, all solder is described to be keep in the first tank 20 and the first connection channel 12a. However, the tank for accumulating the molten solder during non-scanning operation is not limited to the first tank 20. In other embodiment, the second tank 40 may be used to accumulate the molten solder during lift up of the IMS head 10.

As described above, the IMS head 10 according to the exemplary embodiment has been described to have two tanks 20, 40. However, the number of the tanks in the IMS head 10 is not limited to two. In other embodiment, the IMS head 10 may have a single tank as will be described latter or may have three or more tanks. Also note that the IMS head 10 has been described as having only major components. However, it should be noted that there are other components and/or structures for functioning the IMS head 10 as an injection head for IMS process.

Hereinafter, with reference to a series of FIGS. 7A, 7B, and 7C, an injection apparatus according to other exemplary embodiment of the present invention is described, in which the injection apparatus is an IMS head 50 used for an IMS process.

Figure 7A:
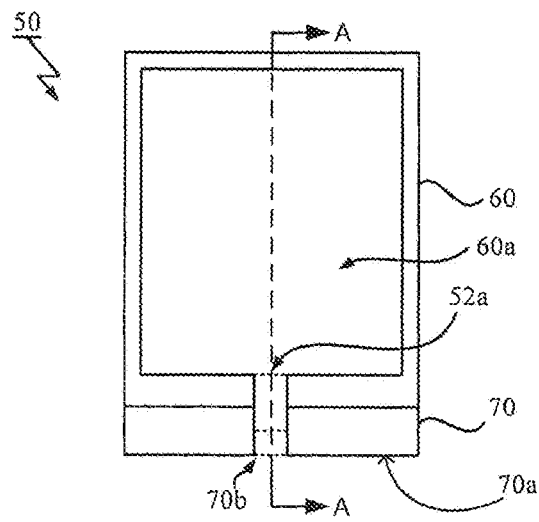
FIGS. 7A, 7B, and 7C illustrate cross sectional views and a bottom view of an IMS head for injecting molten solder according to other exemplary embodiment of the present invention.
Figure 7B:
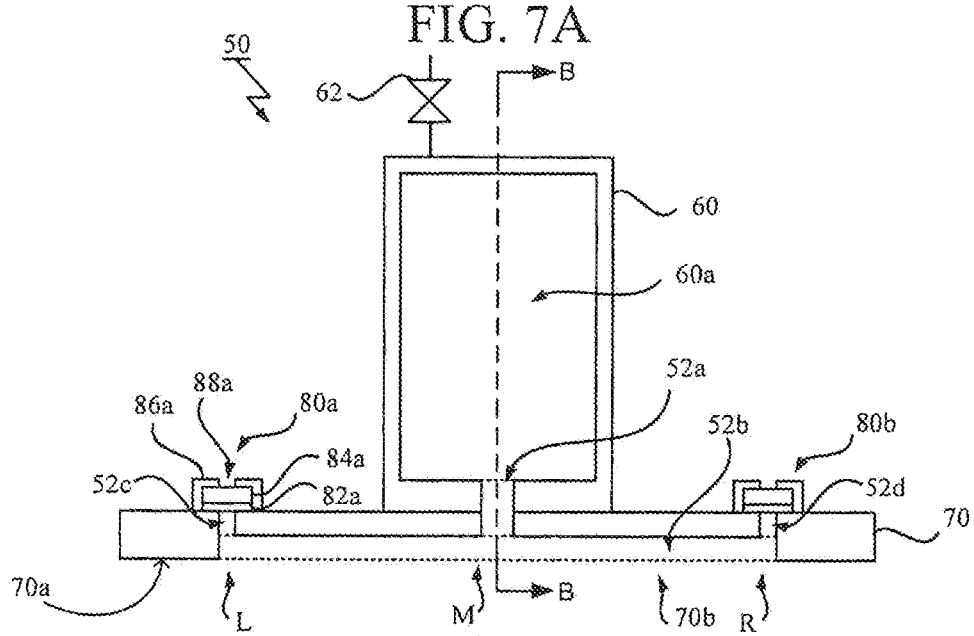
Figure 7C:
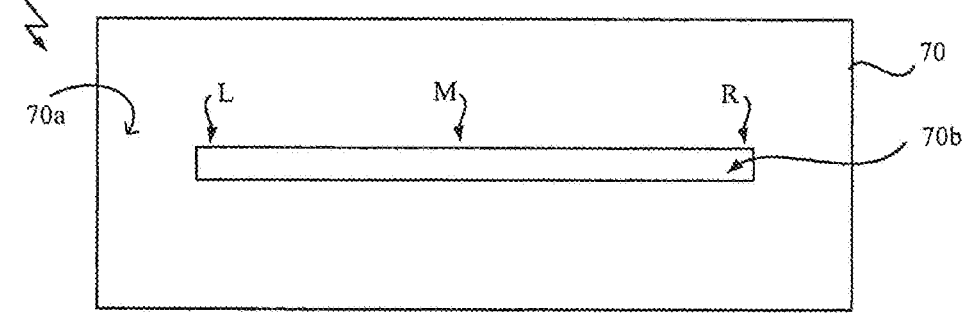

FIGS. 7A, 7B and 7C illustrate views of the IMS head 50 used for injecting molten solder to a target substrate. As similar to FIGS. 1A, 1B, and 1C, FIGS. 7A and 7B show cross-sectional views of the IMS head 50 and FIG. 7C shows a bottom view of the IMS head 50. Note that the cross-sectional view shown in FIG. 7A corresponds to a cross-section indicated by "B" in FIG. 7B and the cross-sectional view shown in FIG. 7B corresponds to a cross-section indicated by "A" in FIG. 7A. Note that since the IMS head 50 has similar structure and functionality to the aforementioned IMS head 10, descriptions will focus on differences from IMS head 10.

As shown in FIGS. 7A and 7B, the IMS head 50 includes a tank 60 for storing molten solder; a head body 70 for contacting the target substrate and for injecting molten solder to the target substrate, a plurality of porous members 80 (two porous members 80a, 80b in the described embodiment) that allow the gas to flow therethrough while separating the gas from the molten solder. The head body 70 may be formed under the tank 60. As similar to the aforementioned embodiment, the IMS head 50 may include appropriate heating member configured to control temperature of the IMS head 10.

The head body 70 has a bottom surface 70a for contacting the target substrate and an opening 70b opened at the bottom surface 70a for discharging the molten solder in fluid-communication with the tank 60.

The tank 60 has an inner space 60a where the molten solder is stored. The inner space 60a of the tank 60 and the two porous members 80a, 80b are connected to each other through a flow channel 52 formed in the IMS head 50.

The flow channel 52 includes an opening part 52b corresponding to the opening 70b opened at the bottom surface 70a; a first connection channel 52a connected to the tank 60 and the opening part 52b; and two second connection channels 52c, 52d connected to the opening part 52b and two porous members 80a, 80b, respectively. As shown in FIG. 7C, in the described embodiment, the opening part 52b (and the opening 70b) has a form of a slit. The tank 60 is connected to the opening part 52b at a position of a middle M of the slit. The porous members 80a, 80b are connected to the opening part 52b at positions away from the middle M of the slit. In the embodiment described in FIGS. 7B and 7C, the first connection channel 72a is connected to the middle M. The opening part 52b has a first end R connected to one second connection channel 72c that is further connected to one porous member 80a and a second end L connected to other second connection channel 72d that is further connected to other porous member 80b.

The tank 60 may be equipped with an on-off valve 62 for opening and closing a channel between the tank 60 and an outside of the IMS head 50. The on-off valve 62 may be configured to be connected to ambient environment, a positive pressure line or a vacuum (negative pressure) line in a manner depending on an operation status of the IMS process.

Each porous member 80 may include a porous film 82 that covers the second connection channel 52c/52d, a porous ceramic 84 formed on the porous film 82 and a cap member 86 that has an opening 88, encloses the porous film 82 and the porous ceramic 84 and fixes them to the head body 70. The porous film 82 and the porous ceramic 84 are permeable to gas such as inert gas (e.g., nitrogen, argon) and thus allow gas to flow in to the second connection channel 52c/52d. The gas flowing into the second connection channel 52c/52d through the porous member 80 may further flow into the opening part 52b and the first connection channel 72a to push the molten solder back to the tank 60 when the opening 70b (the opening part 52b) is covered by the target substrate. In a particular embodiment, the porous member 80 (especially porous film 82) may be a consumable product and may be replaced as often as appropriate. Thus, preferably the porous member 80 is removable and replaceable.

In the embodiment described in FIGS. 7A, 7B, and 7C, thus, two porous members 80a, 80b work as members that are connected to the opening part 52b and allow the gas to flow in to and flow out from the opening part 52b especially when transferring the molten solder between the opening part 52b and the first tank 60. Note that the position where the porous member 80 is located is not limited to the top surface of the head body 70 as shown in FIGS. 7A, 7B, and 7C. The porous member 80 may be located at a side of the head body 70.

The IMS head 50 shown in FIGS. 7A, 7B, and 7C may be configured to be scanned on the target substrate with the opening part 52b covered by the target substrate and filled with the molten solder. During scanning or contacting of the IMS head 50 on the target substrate, the molten solder is retained in the opening part 52b and the tank 60. And the molten solder is injected from the opening part 52b into a hole or cavity formed at the surface of the target substrate. Also the IMS head 50 may be configured to be lifted up from the target substrate in order to replace the target substrate with a new target substrate. During lift up of the IMS head 50, the molten solder has been moved to the tank 60 and no molten solder is left in the opening part 52b.

With reference to a series of FIGS. 8A, 8B, and 8C and FIGS. 9A, 9B, and 9C, an IMS process using the IMS head 50 according to the other exemplary embodiment of the present invention is described. FIGS. 8A, 8B and 8C and FIGS. 9A, 9B and 9C illustrate cross sectional views of the IMS head 50 in each step of the IMS process.

Figure 8A:
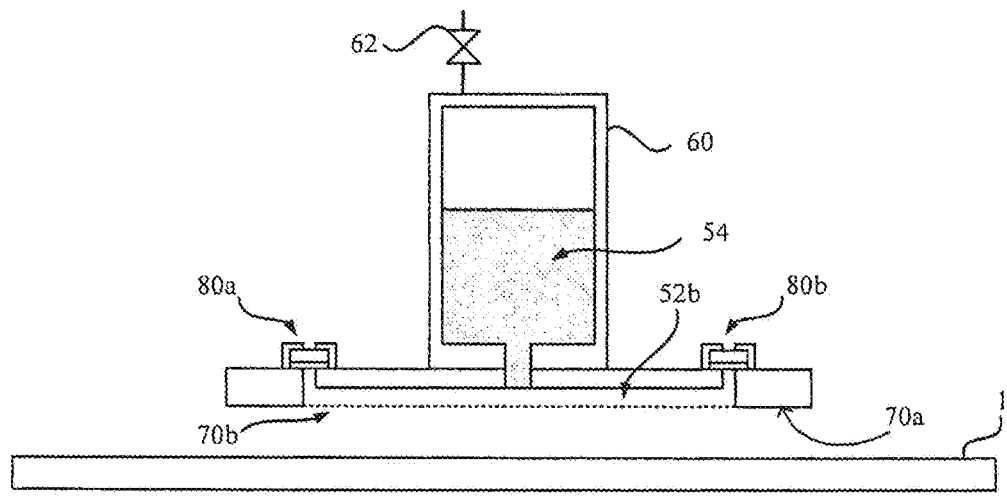
FIGS. 8A, 8B and 8C illustrate cross sectional views of the IMS head in each step of an IMS process according to the other exemplary embodiment of the present invention.

As shown in FIG. 8A, the IMS process may include a step of initiating the IMS process with the IMS head 50 lifted over a target substrate 1. In the step of initiating the IMS process, the on-off valve 62 is closed when all solder exists in the tank 60 and the first connection channel 52a. In other embodiment, the vacuum function is employed and the on-off valve 62 connected to the tank is open and connected to the vacuum line.

Figure 8B:
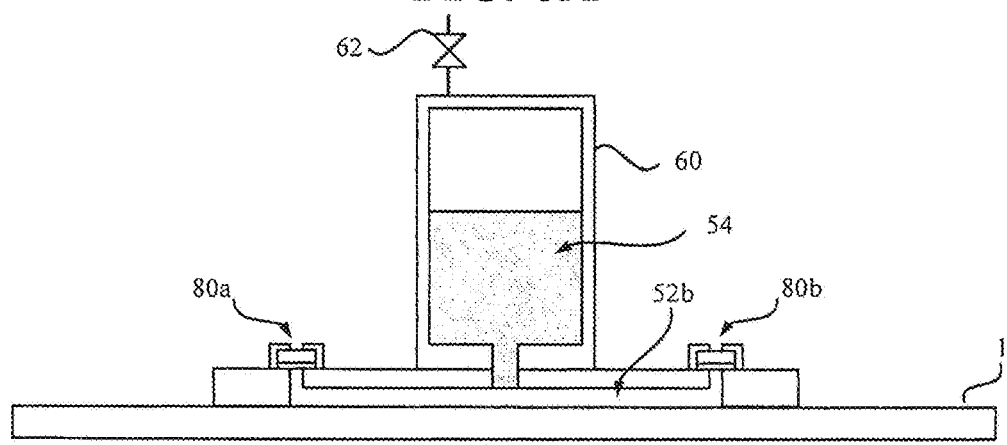

As shown in FIG. 8B, the IMS process may also include a step of placing the IMS head 50 onto the target substrate 1 so that the bottom surface 70a of the head body 70 is in contact with the target substrate 1 and the opening part 52b opened at the bottom surface 70a is covered by the target substrate 1. The IMS head 50 is pushed on the target substrate 1 by appropriate pressure. The state of the on-off valve 62 may be same as the step of initiating the IMS process.

Figure 8C:
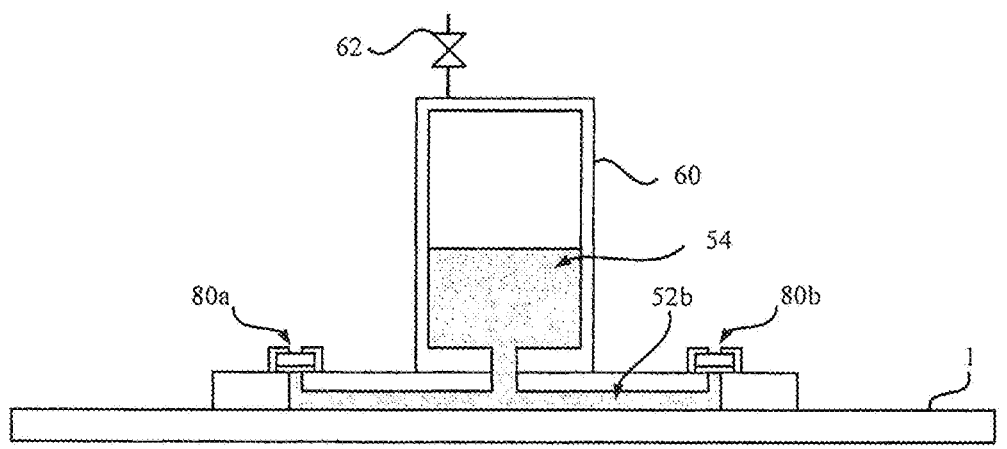

As shown in FIG. 8C, the IMS process may also include a step of providing molten solder 54 to the opening part 52b of the head body 70 from the tank 60. In the step of providing the molten solder 54 to the opening part 52b, the on-off valve 62 is open and inert gases flows from the positive pressure line to the tank 60 via the on-off valve 62, and the molten solder 54 retained in the tank 60 is pushed into the first connection channel 52a, the opening part 52b and two second connection channels 52c, 52d in that order. The opening part 52b of the IMS head 50 is fully filled with the molten solder 54. Since the porous members 80a, 80b that are connected to the opening part 52b allow gas to flow therethrough, the porous members 80a, 80b release the gas flowing from the opening part 52b to ambient environment during the transfer of the molten solder 54. After the opening part 52b of the IMS head 50 is fully filled with the molten solder 54, the on-off valve 62 may be open and connected to ambient environment.

Figure 9A:
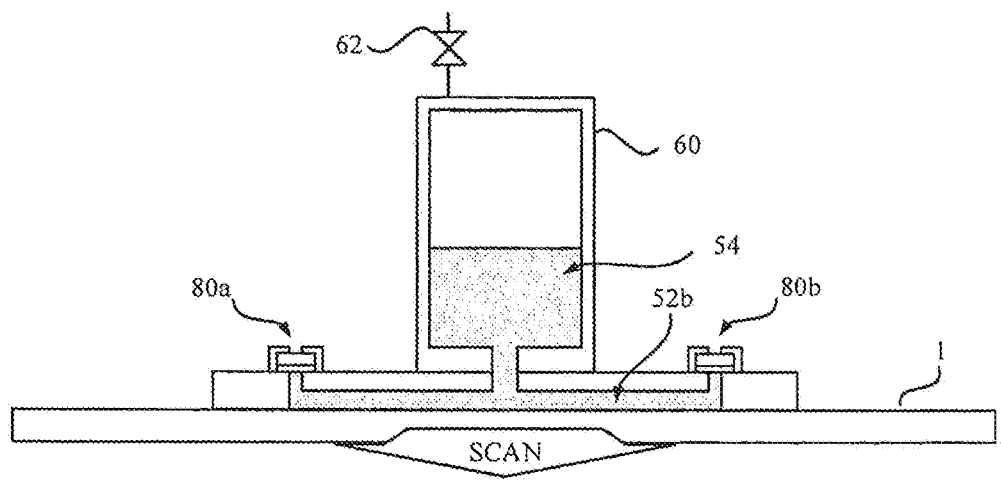
FIGS. 9A, 9B and 9C illustrate other cross sectional views of the IMS head in each step of the IMS process according to the other exemplary embodiment of the present invention.

As shown in FIG. 9A, the IMS process may further include a step of discharging the molten solder 54 from the opening part 52b (the opening 70b) of the IMS head 50 to the target substrate 1 while scanning the IMS head 50 on the target substrate 1 in the horizontal plane. In the step of discharging the molten solder 54 from the opening part 52b, the on-off valve 62 is open and connected to the positive pressure line so that pressure is applied to the top surface of the molten solder 54 in the tank 60. After the IMS scan is completed for this target substrate 1 currently mounted on the stage, the on-off valve 62 is open and connected to ambient environment.

Figure 9B:
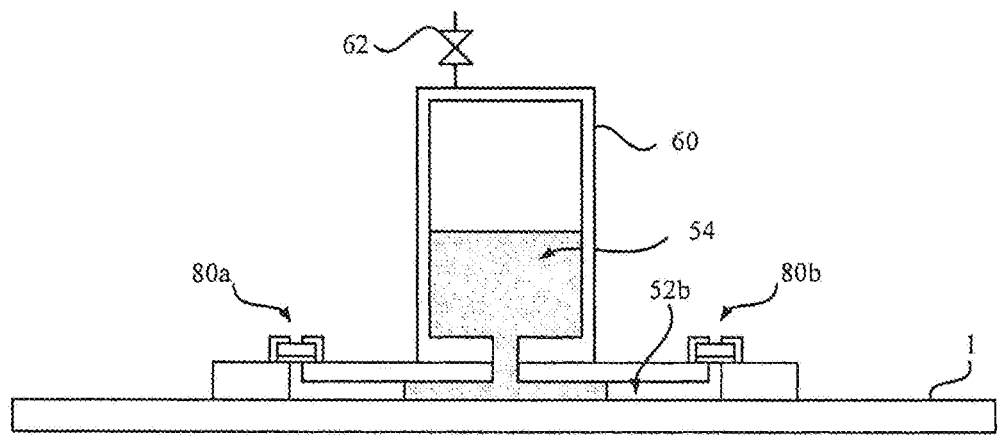

As shown in FIG. 9B, the IMS process may include further a step of transferring the molten solder 54 filled in the opening part 52b to the tank 60 of the IMS head 50 while taking gas into the opening part 52b through the porous members 80a, 80b. In the step of transferring the molten solder 54 to the tank 60, the on-off valve 62 is open and connected to a vacuum (negative pressure) line. The solder in the flow channel 52 is drawn and reverted to the tank 60 through the flow channel 52 while releasing the gas in a void of the inner space 60a of the tank 60 to outside of the IMS head 50 through the on-off valve 62.

Figure 9C:
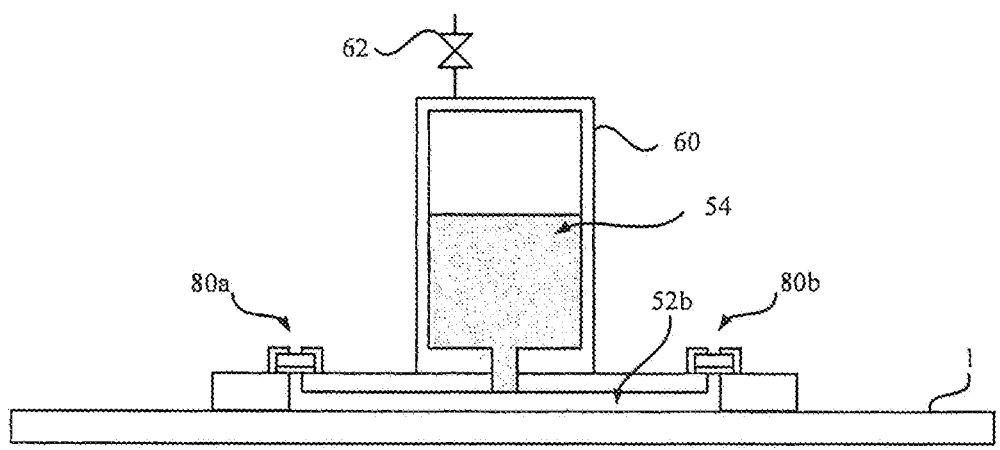

As shown in FIG. 9C, after the transfer of the molten solder 54 to the tank 60 is complete, a space of the opening part 52b becomes vacant. The IMS process may include a step of sealing the tank 60 with the on-off valve 62 closed in response to the molten solder being transferred from the opening part 52b to the tank 60. Alternatively, IMS process may include a step of vacuuming the tank 60 with the on-off valve 62 opened at least in part and connected to the vacuum line.

Then, the IMS process goes back to the step shown in FIG. 8A. With reference to FIG. 8A again, the IMS process may further include a step of lifting up the IMS head 50 from the target substrate 1 in response to the tank 60 being sealed or vacuumed. During the lift up of the IMS head 50, the target substrate 1 would be exchanged with a new target substrate by moving the IMS head 50 out of the target substrate 1, replacing the target substrate 1 with the new target substrate; and moving the IMS head 50 onto the new target substrate.

The IMS head 50 according to the other exemplary embodiment has been described to have one tank 60 and two porous members 80a, 80b. However, the number of the tanks in the IMS head 50 is not limited to one. In other embodiment, the IMS head 10 may have two or more tanks. Also the number of the porous members 80 is not limited to two. In other embodiment, the IMS head 10 may have one, or three or more porous members 80. For example, the IMS head may include one tank and one porous member and the opening part has a first end R connected to one connection channel that is further connected to one tank and a second end L connected to other connection channel that is further connected to one porous member 80.

Also the IMS head 50 according to the other exemplary embodiment has been described to have porous members 80a, 80b as a member allowing the gas to flow therethrough. However, in other embodiments, instead of using the porous member 80, simpler member such as one or more tiny holes may be formed at a position (e.g., a top or side of the head body 70) where the porous member 80 has been described to be located in the aforementioned embodiment. In this embodiment, the gas is taken into the opening part 52a through the one or more tiny holes. Preferably such tiny holes may prevent the molten solder from passing through the holes. Such one or more holes may work as a member that is connected to the opening part 52b and allow the gas to flow into and flow out from the opening part 52b especially when transferring the molten solder between the opening part 52b and the first tank 60. Note that the IMS head 50 may have heating member around the one or more tiny holes to prevent the tiny holes from clogging in other embodiment.

In further other embodiments, instead of forming one or more tiny holes at the top surface of the head body 70, a groove that extends from an end of the opening part 52b and is connected to an outside of the head body 70 may be formed in the cushion layer of the surface of the head body 70. In this case, a hole is opened at a side of the head body 70 (e.g., an edge of the cushion layer). Such groove is expected to be closed when the IMS head 50 is pushed against the target substrate 1 by appropriate pressure and opened when the pressure to press the IMS head 50 against the target substrate 1 is weakened. Such groove may work as a member that is connected to the opening part 52b and allow the gas to flow into and flow out from the opening part 52b.

In further other embodiments, instead of using the porous member 80, an extension pipe equipped with an on-off valve at one end thereof may be attached at a position where the porous member 80 has been described to be located in the aforementioned embodiment. The extension pipe may be connected to a second connection channel 52c/52d that is further connected to the opening part 52b. The extension pipe may have a predetermined length as long as volume of a void in the extension pipe is kept so that the molten solder does not reach the on-off valve even when pressure is applied during scanning. Such extension pipe may work as a member that is connected to the opening part 52b and allow the gas to flow into and flow out from the opening part 52b.

With reference to a series of FIGS. 10A, 10B, and 10C and FIGS. 11A and 11B, a related IMS head for injecting molten solder and a related IMS process are described.

Figure 10A:
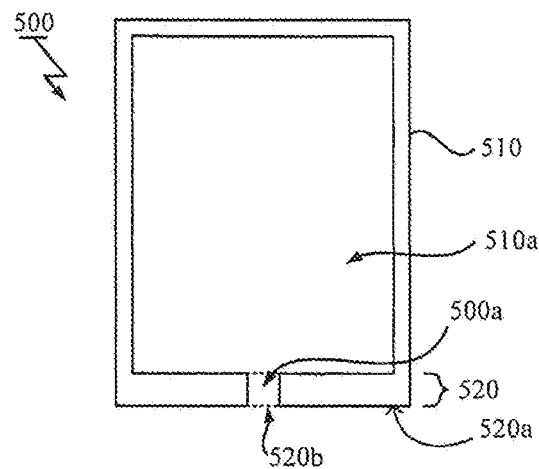
FIGS. 10A, 10B, and 10C illustrate views of a related IMS head for injecting molten solder.
Figure 10B:
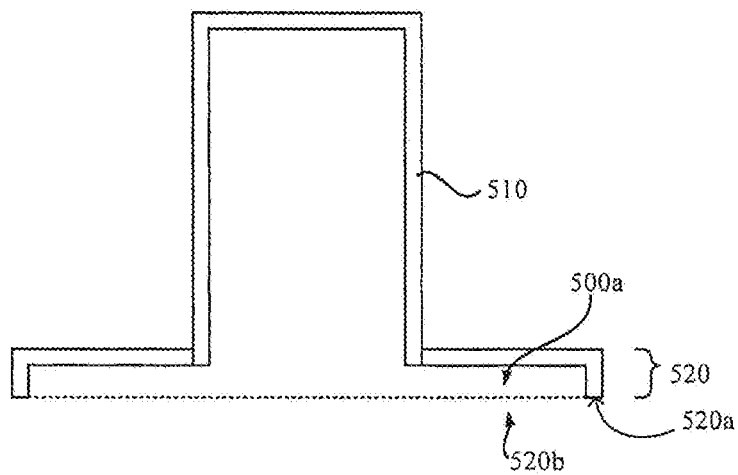
Figure 10C:
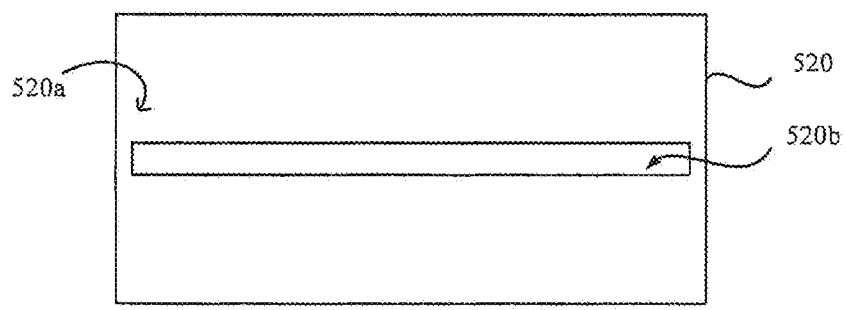

FIGS. 10A, 10B, and 10C illustrate views of the related IMS head 500. The related IMS head 500 includes a tank 510 for storing molten solder and a head body 520 for contacting a target substrate. The head body 520 has a bottom surface 520a for contacting the target substrate and a slit opening 520b opened at the bottom surface 520a. The tank 510 has an inner space 510a where the molten solder is stored. The inner space 510a of the tank 510 is in fluid communication the slit opening 520b.

Figure 11A:
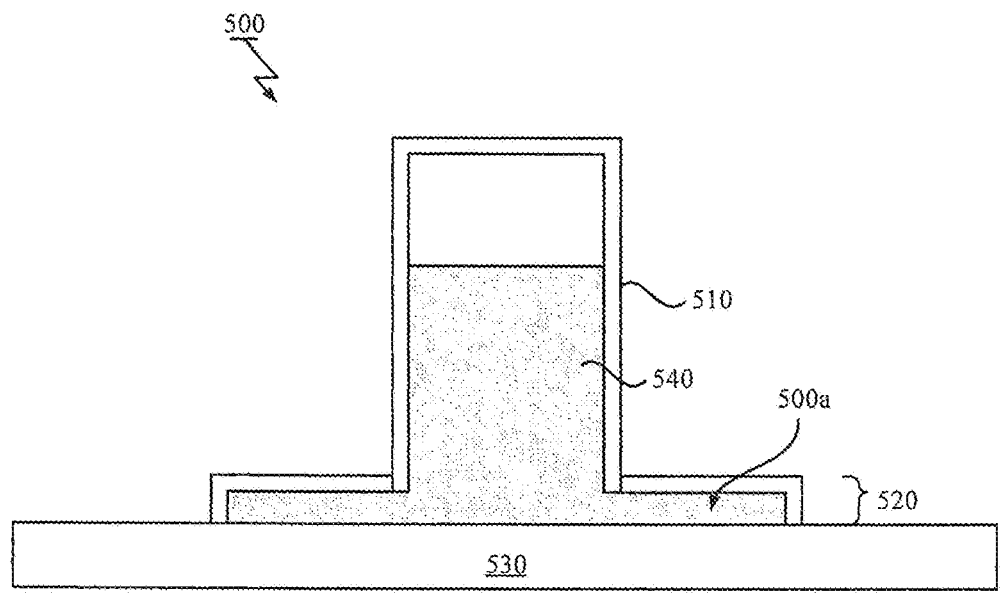
FIGS. 11A and 11B illustrate cross sectional views of the related IMS head in each step of a related IMS process.
Figure 11B:
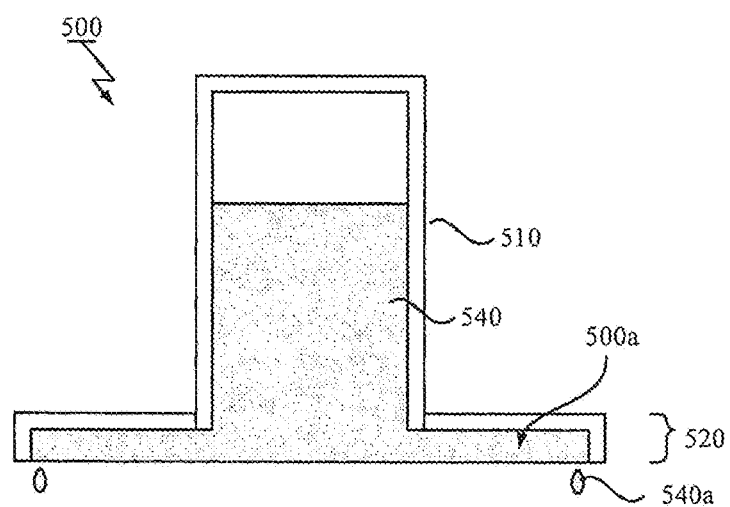

FIGS. 11A and 11B illustrate cross sectional views of the related IMS head 500 in each step of the related IMS process. During scanning or contacting of the related IMS head 500 on the target substrate 530, the molten solder 540 is retained in the slit opening part 500a and the inner space 510a of the tank 510. For scanning a next substrate, the IMS head 500 is lifted up and the next substrate is set on the stage. However, as illustrated in FIG. 11B, during lift up of the IMS head 500, the molten solder 540 still exist in the slit opening part 500a and a part of the molten solder in the IMS head 500 would be dripping from the slit opening 500a as depicted in FIG. 11B as a droplet 540a. To avoid it, vacuum function may be employed. However, when the slit shape is wide and long, the molten solder 14 would be dripping even with sack back function.

In contrast to the related IMS head, since the at least one member is configured to allow gas to flow into and flow out from the opening part of the head body for discharging the molten solder, it becomes possible to vacate a space of the opening part smoothly and easily by transferring the molten solder to the tank while taking gas into the opening part through the at least one member. Thus, it is possible to avoid dripping of the molten solder from the opening part of the IMS head without degrading process productivity.

Since transferring of the molten solder from the opening part to the tank may be conducted fast and smoothly even when compared to the case where the molten solder is solidified before the movement of the IMS head, degradation of process productivity is expected to be minimized. Solidification of the molten solder would take a relatively long time, which is empirically several minutes, since a whole of the IMS head with large heat capacity is also heated to the operation temperature.

In a preferable embodiment where the opening part has a form of a slit and each of the at least one member is connected to the opening part at a position away from a middle of the slit, it is possible to improve the process productivity since the slit like opening covers wide area of the substrate in one scan.

Hereinabove, the injection apparatuses, the methods and the material injection systems for injecting material to a substrate has been described, in which the material to be injected by the injection apparatus is the molten solder and the injection apparatus is the IMS head 10 or 50 used for an IMS process. Although aforementioned features of the injection apparatuses, the methods and the material injection systems are preferable for the IMS process since the injection apparatus for the IMS generally operates at high temperatures. In such high temperature condition (e.g., Su-3.0Ag-0.5Cu (SAC305) lead free solder has melting point of 217 Celsius degrees (solidus temperature) and the IMS head is heated to around 230 Celsius degrees when using SAC305), ways of preventing the material from dripping from the opening part would be limited. The injection apparatuses, the methods and the material injection systems according to one or more embodiments of the present invention implements a practical solution to avoid dripping of the molten solder from the opening part during the IMS process.

However, injection apparatus, methods and material injection systems are not limited to the aforementioned IMS heads, the IMS processes and the IMS systems, any injection apparatuses, methods and material injection systems for injecting any liquid or paste material to a target substrate are contemplated. Such fluid or paste may include molten plastics, conductive paste, which may contain a suspension of conductive granular material in a background fluid material, to name but a few.

Having described the advantages obtained with respect to the one or more specific embodiments according to the present invention, it should be understood that some embodiments may not have these potential advantages and these potential advantages are not necessarily included of all embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for injecting material, comprising:
    placing an injection apparatus onto a substrate, the injection apparatus comprising a first tank for storing a material; a second tank in fluid communication with the first tank; and a head body having a surface in contact with the substrate and an opening part opened at the surface;
    filling the opening part with the material; and
    transferring the material filled in the opening part to the first tank of the injection apparatus while taking gas into the opening part through at least one member including an extension pipe equipped with an on-off valve for opening and closing a channel between the extension pipe and an ambient environment.

2. The method of claim 1, wherein the first tank includes a first valve and the second tank includes a second valve.

3. The method of claim 1, wherein the head body is disposed under the first and second tanks.

4. The method of claim 1, wherein the second tank is in fluid communication with the first tank via a single flow channel.

5. The method of claim 4, wherein the head body is horizontally aligned with the single flow channel.

6. The method of claim 5, wherein the single flow channel of the head body includes a first connection channel connected to the first tank and a second connection channel connected to the second tank.

7. The method of claim 6, wherein the extension pipe is connected to the second connection channel.

8. The method of claim 1, wherein the extension pipe has a predetermined length as long as volume of a void in the extension pipe is kept so that molten solder does not reach the on-off valve even when pressure is applied during scanning.

9. The method of claim 1, wherein the extension pipe is connected to the opening part to allow gas to flow into and flow out of the opening part.

10. The method of claim 1, wherein the injection apparatus is scanned on the substrate with the opening part covered by the substrate and filled with the material.

11. The method of claim 1, wherein the injection apparatus is lifted up from the substrate in response to transfer of the material from the opening part to the first tank.

12. A method for injecting material, comprising:
    placing an injection apparatus onto a substrate, the injection apparatus comprising at least one tank for storing a material; and a head body having a surface in contact with the substrate and an opening part opened at the surface and covered by the substrate;
    filling the opening part with the material; and
    transferring the material filled in the opening part to the at least one tank of the injection apparatus while taking gas into the opening part through at least one member including an extension pipe.

13. The method of claim 12, wherein the extension pipe is equipped with an on-off valve for opening and closing a channel between the extension pipe and an ambient environment.

14. The method of claim 12, wherein the at least one tank includes a first tank and a second tank, the first and second tanks being in fluid communication with each other via a single flow channel.

15. The method of claim 14, wherein the head body is horizontally aligned with the single flow channel.

16. The method of claim 15, wherein the single flow channel of the head body includes a first connection channel connected to the first tank and a second connection channel connected to the second tank.

17. The method of claim 16, wherein the extension pipe is connected to the second connection channel.

18. The method of claim 12, wherein the extension pipe has a predetermined length as long as volume of a void in the extension pipe is kept so that molten solder does not reach an on-off valve even when pressure is applied during scanning.

19. The method of claim 12, wherein the extension pipe is connected to the opening part to allow gas to flow into and flow out of the opening part.

20. The method of claim 12, wherein the injection apparatus is scanned on the substrate with the opening part covered by the substrate add filled with the material.

* * * * *